United States Patent
Robinson et al.

(10) Patent No.: US 8,941,801 B2
(45) Date of Patent: Jan. 27, 2015

(54) IN-PLANE SWITCHED ACTIVE RETARDER FOR STEREOSCOPIC DISPLAY SYSTEMS

(75) Inventors: Michael G. Robinson, Boulder, CO (US); Jianmin Chen, Superior, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 90 days.

(21) Appl. No.: 13/523,815

(22) Filed: Jun. 14, 2012

(65) Prior Publication Data
US 2013/0148042 A1    Jun. 13, 2013

Related U.S. Application Data

(60) Provisional application No. 61/496,629, filed on Jun. 14, 2011.

(51) Int. Cl.
*G02F 1/1335*    (2006.01)
*G02F 1/13*    (2006.01)
*G02B 27/26*    (2006.01)
*G02F 1/13363*    (2006.01)

(52) U.S. Cl.
CPC .............. *G02F 1/1313* (2013.01); *G02B 27/26* (2013.01); *G02F 1/133528* (2013.01); *G02F 2001/133562* (2013.01); *G02F 2001/133633* (2013.01)
USPC .................. 349/117; 349/37; 349/15; 349/96; 345/87; 345/204; 359/465

(58) Field of Classification Search
CPC ........................... G09G 3/003; H04N 13/0404
USPC ................................ 349/15, 37, 117
See application file for complete search history.

(56) References Cited

U.S. PATENT DOCUMENTS

| | | | |
|---|---|---|---|
| 5,619,355 A * | 4/1997 | Sharp et al. | 349/78 |
| 5,993,004 A * | 11/1999 | Moseley et al. | 353/8 |
| 7,084,945 B2 * | 8/2006 | Nair et al. | 349/122 |
| 7,518,662 B2 * | 4/2009 | Chen et al. | 349/5 |
| 7,528,906 B2 | 5/2009 | Robinson | |
| 7,705,935 B2 * | 4/2010 | Gaudreau | 349/96 |
| 2006/0285026 A1 * | 12/2006 | Robinson | 349/15 |
| 2006/0291053 A1 * | 12/2006 | Robinson et al. | 359/465 |
| 2007/0008406 A1 * | 1/2007 | Shestak et al. | 348/58 |
| 2007/0195272 A1 * | 8/2007 | Hendrix et al. | 353/20 |
| 2007/0206155 A1 * | 9/2007 | Lipton | 353/7 |
| 2008/0246897 A1 | 10/2008 | Gaudreau | |

FOREIGN PATENT DOCUMENTS

KR    10-1999-0066082 A    8/1999

OTHER PUBLICATIONS

International search report and written opinion of international searching authority in PCT/US12/42538 dated Jan. 30, 2012.
U.S. Appl. No. 12/156,683 to Chiu entitled "Display Device" filed Jun. 4, 2008 (commonly-owned).

* cited by examiner

*Primary Examiner* — Edward Glick
*Assistant Examiner* — Sang V Nguyen
(74) *Attorney, Agent, or Firm* — Darlene K. Kondo; Neil G. J. Mothew (57) ABSTRACT

Polarization modulation with in-plane switching of liquid crystals (LCs) may be used in active retarder stereoscopic display systems where viewers wear passive eyewear to see isolated left and right eye images. Embodiments of the present disclosure may include nematic LC or fast switching ferroelectric liquid crystal (FLC), depending on the desired performance.

20 Claims, 6 Drawing Sheets

IN-PLANE SWITCHED ACTIVE RETARDER FOR STEREOSCOPIC DISPLAY SYSTEMS

CROSS-REFERENCE TO RELATED APPLICATION

This application relates and claims priority to commonly-assigned U.S. Provisional Patent Application No. 61/496,629, filed Jun. 14, 2011, and entitled "In-plane switched active retarder for stereoscopic display systems," which is incorporated herein by reference for all purposes.

TECHNICAL FIELD

The present disclosure generally relates to stereoscopic displays, and more specifically, relates to stereoscopic display having an in-plane polarization modulator.

BACKGROUND

Stereoscopic, or stereo, 3-D displays enhance the perception of images presented on a 2-D screen by presenting different images to each eye of the viewer. The viewer's visual system fuses these disparate images in such a way as to create a sensation of depth. To create 3-D effects, conventional approaches have used eyewear to determine which image data goes to the left or right eye.

SUMMARY

Provided in the present disclosure is an exemplary embodiment of a stereoscopic display system, which may comprise a display operable to provide polarized light along a light path and an in-plane liquid crystal modulator disposed in the light path. The in-plane liquid crystal modulator may comprise at least one liquid crystal cell having substantially no out-of-plane retardance, the at least one liquid crystal cell being operable to receive the polarized light and to switch between first and second in-plane orientations sequentially to provide modulated light having first and second states of polarization, respectively. The modulated light having the first state of polarization may be operable to form a left image and the modulated light having the second state of polarization may be operable to form a right image.

Provided in the present disclosure is another exemplary embodiment of a stereoscopic system which may comprise a display operable to provide polarized light along a light path, an in-plane liquid crystal modulator disposed in the light path, and eyewear comprising a left analyzer and a right analyzer. The in-plane liquid crystal modulator may comprise at least one liquid crystal cell having an in-plane retardance and substantially no out-of-plane retardance, the at least one liquid crystal cell being operable to receive the polarized light and to switch between first and second in-plane orientations sequentially to provide modulated light having first and second states of polarization, respectively. The left analyzer may comprise a left inverse retarder and a left polarizer layer optically following the left inverse retarder, and the right analyzer may comprise a right inverse retarder and a right polarizer layer optically following the right inverse retarder. The left and right inverse retarders may each comprise a retardance substantially inverse to the in-plane retardance of the at least one liquid crystal cell. When the at least one liquid crystal cell is in the first in-plane orientation, the left analyzer is operable to receive the modulated light having the first state of polarization and to transmit light comprising a left image, and when the at least one liquid crystal cell is in the second in-plane orientation, the right analyzer is operable to receive the modulated light having the second state of polarization and to transmit light comprising a right image.

Provided in the present disclosure is an exemplary embodiment of a method of providing stereoscopic images. The disclosed method may comprise directing polarized light from a display along a light path towards an in-plane liquid crystal modulator, wherein the in-plane liquid crystal modulator comprises at least one liquid crystal cell having substantially no out-of-plane retardance. The disclosed method may further comprise receiving the polarized light at the at least one liquid crystal cell, switching the at least one liquid crystal cell between first and second in-plane orientations sequentially to provide modulated light having first and second states of polarization, respectively. The modulated light having the first state of polarization is operable to form a left image and the modulated light having the second state of polarization is operable to form a right image.

BRIEF DESCRIPTION OF THE DRAWINGS

Embodiments are illustrated by way of example in the accompanying figures in which.

DETAILED DESCRIPTION

Figure 1:
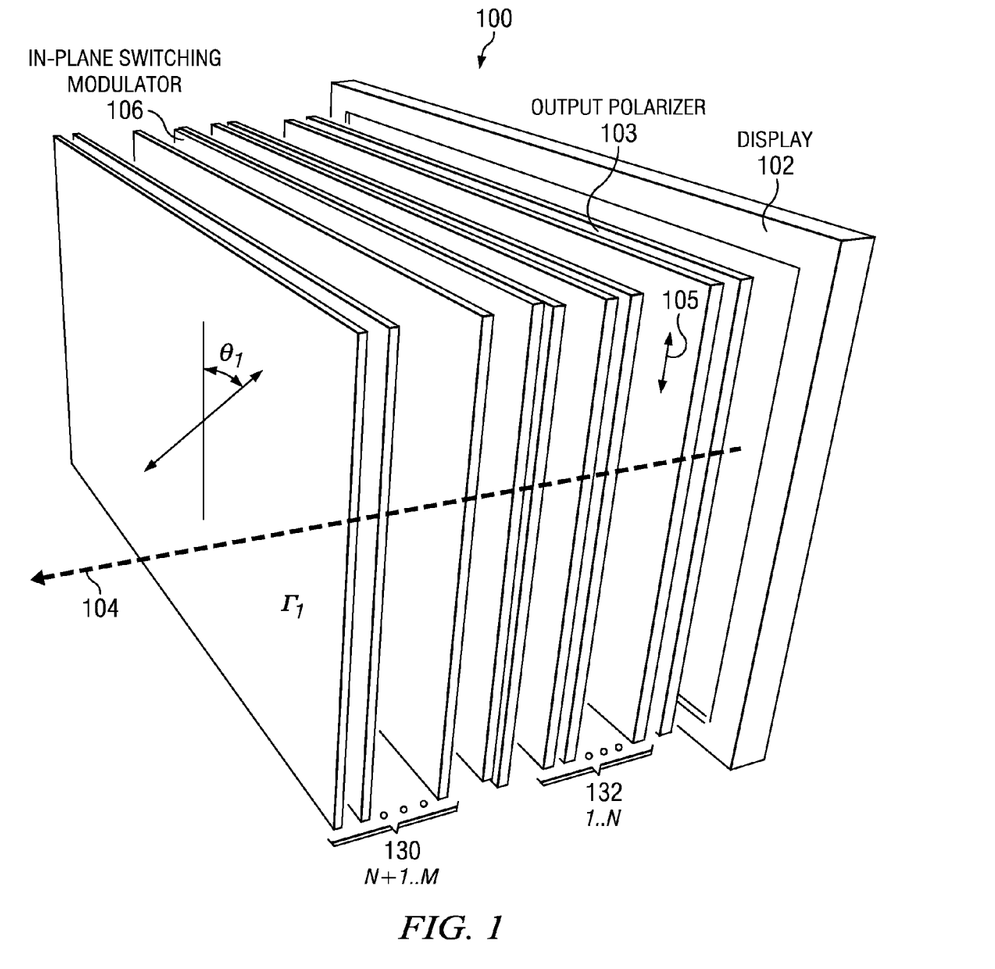
FIG. 1 is a schematic diagram illustrating an exemplary stereoscopic display system with an in-plane LC modulator, in accordance with the present disclosure.

FIG. 1 is a schematic diagram of an exemplary stereoscopic display system 100. In an embodiment, the stereoscopic display system 100 may include a display 102 operable to provide polarized light along a light path 104. In an embodiment, the polarized light is provided through an output polarizer 103 disposed in the light path 104. The stereoscopic display system 100 may also include an in-plane liquid crystal (LC) modulator 106 disposed in the light path 104 and operable to receive the polarized light originated from the display 102. To provide stereoscopic images in an exemplary embodiment, the in-plane LC modulator 106 may include at least one LC cell (not shown) operable to receive the polarized light and to switch between first and second in-plane orientations sequentially to provide modulated light having first and second states of polarization, respectively. The modulated light having the first state of polarization may be operable to form a left image and the modulated light having the second state of polarization may be operable to form a right image. The LC cell of the in-plane LC modulator 106 may have an in-plane retardance but substantially no out-of-plane retardance, which may allow for improvements in stereoscopic performance that will be discussed below in the present disclosure.

Figure 2:
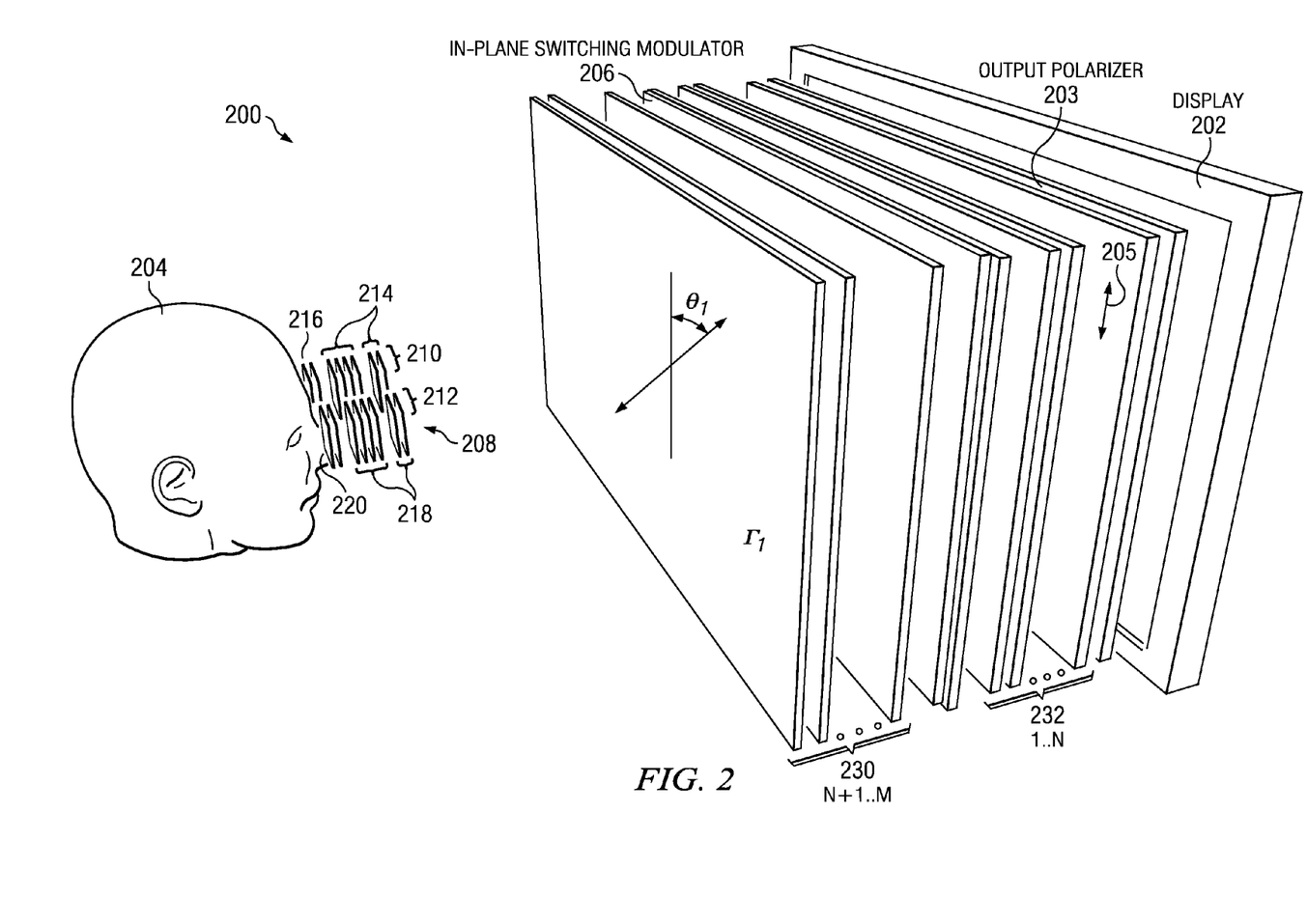
FIG. 2 is a schematic diagram illustrating an exemplary stereoscopic display system with an in-plane LC modulator and corresponding eyewear analyzer; in accordance with the present disclosure.

FIG. 2 is a schematic diagram of an exemplary stereoscopic system 200. In an embodiment, the stereoscopic system 200 may include elements similar to that of the stereoscopic display system 100. The stereoscopic system 200 may include a display 202 operable to provide polarized light along a light path towards a viewer 204 and an in-plane LC modulator 206 disposed in the light path. In an embodiment, the polarized light may be provided through an output polarizer 203 disposed in the light path. An embodiment of the in-plane LC modulator 206 may include at least one LC cell (not shown) operable to receive the polarized light and to switch between first and second in-plane orientations sequentially to provide modulated light having first and second states of polarization, respectively. Like the LC cell of the LC modulator 106, the LC cell of the LC modulator 206 may have an in-plane retardance and substantially no out-of-plane retardance. The modulated light having the first state of polarization may be operable to form a left image and the modulated light having the second state of polarization may be operable to form a right image. To perceive the left and right images, the viewer 204 may receive the modulated light through eyewear analyzer 208. In an embodiment, the eyewear analyzer 208 may include a left analyzer 210 and a right analyzer 212. The left analyzer 210 may include a left inverse retarder 214 and a left polarizer layer 216 optically following the left inverse retarder 214, and the right analyzer 212 may include a right inverse retarder 218 and a right polarizer layer 220 optically following the right inverse retarder 218. In an embodiment, the left and right inverse retarders 214, 218 may have a retardance substantially inverse to the in-plane retardance of the LC cell of the LC modulator 206.

In operation, the display 202 may be able to sequentially provide left- and right-eye images in synchronization with the in-plane LC modulator 206. The system 200 may operate by displaying sequential left and right eye frames switching near instantaneously between them. At the transition between frames, the in-plane LC modulator 206 switches the state of polarization of the light passing therethrough and swaps the blocking analyzers 210, 212. Stereoscopic image isolation may be achieved by configuring the right analyzer 212 to transmit the right image and block the modulated light of the first state of polarization when the LC cell of the modulator 206 is in the second in-plane orientation, and by configuring the left analyzer 210 to transmit the left image and block the modulated light of the second state of polarization when the LC cell of the modulator 206 is in the first in-plane orientation. It is to be appreciated that the eyewear analyzer 208 may be tailored in accordance with the principles of the present disclosure to allow various configurations of the stereoscopic system 200 suitable for allowing the viewer 204 to perceive isolated left and right images in the left and right eyes, respectively. This may be attributable to the ability to build a substantially perfect inverse analyzer for retarders that have an in-plane retardance but substantially no out-of-plane retardance. The analyzers 210, 212 of the stereoscopic system 200 may also substantially block for all off-axis angles without requiring complex and expensive out-of-plane retarder films to provide isolation at the periphery of a display when viewing normally. This is unique to in-plane, uniaxial modulating solutions.

Referring to the embodiments shown in both FIGS. 1 and 2, to implement some exemplary polarization modulation schemes, the stereoscopic display system 100 may further include a passive retarder 130 disposed in the light path 104, and the stereoscopic display system 200 may include a similarly positioned passive retarder 230. In an embodiment, the passive retarders 130, 230 may be disposed between the display 102, 202 and the in-plane liquid crystal modulator 106, 206, respectively, or in the light path optically following the in-plane LC modulator 106, 206, respectively. In an embodiment, the stereoscopic display system 100 may further include a second passive retarder 132 disposed in the light path 104, and the stereoscopic system 200 may include a similarly-positioned, second passive retarder 232. The second passive retarders 132, 232 may be disposed between the display 102, 202 and the in-plane liquid crystal modulator 106, 206, respectively, or in the light path optically following the in-plane liquid crystal modulator 106, 206, respectively. The order of the in-plane LC modulator 106, 206 and the passive retarders 130, 132, 230, 232 may be chosen in view of mechanical and optical considerations. Advantages of having the in-plane LC modulators 106, 206 on the outside sandwiching the passive retarders 130, 132, 230, 232 may include resistance to scratching, moisture protection, and suitability as a surface for additional optical components, such as those used for touch screen purposes.

The passive retarders 130, 132, 230, and 232 may each include a stack of passive retarder films. In the embodiments illustrated in FIGS. 1 and 2, the passive retarder 132 may include N retarder films, and the passive retarder 232 may be similarly configured. The passive retarder 130 may include M-N retarder films, and the passive retarder 230 may be similarly configured.

In an embodiment, the optical properties of the modulated light in the display systems 100 and 200 may be determined by the optical behavior of the retarder 130, 230, the second retarder 132, 232, and the in-plane LC modulator 106. 206 in one of its orientations, $\phi_1$. As such, the optical properties of the modulated light may be determined by considering the following:

$(\Gamma_1, \theta_1), (\Gamma_2, \theta_2) \ldots (\Gamma_N, \theta_N), (\Gamma, \phi_1), (\Gamma_{N+1}, \theta_{N+1}), (\Gamma_{N+2}, \theta_{N+2}) \ldots (\Gamma_M, \theta_M)$, in which, $\Gamma$ is a retardance of an optical component, and $\theta$ is its orientation angle relative to the input polarization direction of the polarized light from the display 102, 202. In an exemplary embodiment, the output polarizer 103, 203 may have an optical axis 105, 205, respectively, aligned along the vertical direction and polarization direction of the polarized light from the display 102, 202 would have the same vertical orientation as shown in FIGS. 1 and 2.

As discussed above, the eyewear analyzer 208 may include left and right inverse retarders 214, 218. In an embodiment, the left and right inverse retarders 214, 218 may include retarder layers that have the same retardance values as that of the retarders 230, 232 and in-plane LC modulator 206. The retarder layers of the left and right inverse retarders 214, 218 may be stacked in reverse order and oriented orthogonally relative to the retarders 230, 232 and in-plane LC modulator 206. An exemplary configuration of one of the left and right inverse retarders 214, 218 that blocks the light output when the LC cell of the in-plane LC modulator 206 is oriented at $\phi_1$, is shown below:

$(\Gamma_M, \theta_M+90°), (\Gamma_{M-1}, \theta_{M-1}+90°), \ldots (\Gamma_{N+1}, \theta_{N+1}+90°), (\Gamma, \phi_1+90°), (\Gamma_N, \theta_N+90°), (\Gamma_{N-1}, \theta_{N-1}+90°), \ldots (\Gamma_1, \theta_1+90°)$ The left and right polarizers 216, 218 may be positioned such that they are the nearest to the eyes of the viewer 204 and oriented orthogonal to the polarization direction 205 of the polarized light. An exemplary configuration of the other one of the left and right inverse retarders 214, 218 that which blocks the light output when the LC cell of the in-plane LC modulator 206 is oriented at $\phi_2$, is shown below:

$(\Gamma_M, \theta_M+90°), (\Gamma_{M-1}, \theta_{M-1}+90°), \ldots (\Gamma_{N+1}, \theta_{N+1}+90°), (\Gamma, \phi_2+90°), (\Gamma_N, \theta_N+90°), (\Gamma_{N-1}, \theta_{N-1}+90°), \ldots (\Gamma_1, \theta_1+90°)$ Retardance values that match for all visible wavelengths may allow for perfect analyzing, and as such, in an embodiment, same retarder materials may be used to exhibit substantially identical dispersion. In an embodiment, slight dispersion mismatch causes only minor leakage, in which case, eyewear may be manufactured from a variety of materials with tolerable degradation in performance.

It is to be appreciated the use of in-plane switching (IPS) devices in suitable stereoscopic systems in accordance with the principles of the present disclosure may allow for synergistic performance improvements in some embodiments. Suitable stereoscopic systems may include active retarder-based switching modulators and passive eyewear for the viewer to see isolated left and right eye images. Examples of suitable stereoscopic systems include those described in commonly-assigned U.S. application Ser. No. 12/156,683, which is herein incorporated by reference. Retarders may show increasing tolerance to off-axis transmission when less redundant out-of-plane retardance exists. For example, pi-cells, with their significant out-of-plane retardance, perform less well off-axis than electrically controlled birefringence (ECBs) devices, since the latter modulate by switching the entire cell retardance ($=\Delta n.d$). In-plane switching (IPS) may further improve the off-axis performance of a stereoscopic system by reducing or substantially eliminating out-of-plane retardance.

Figure 3A:
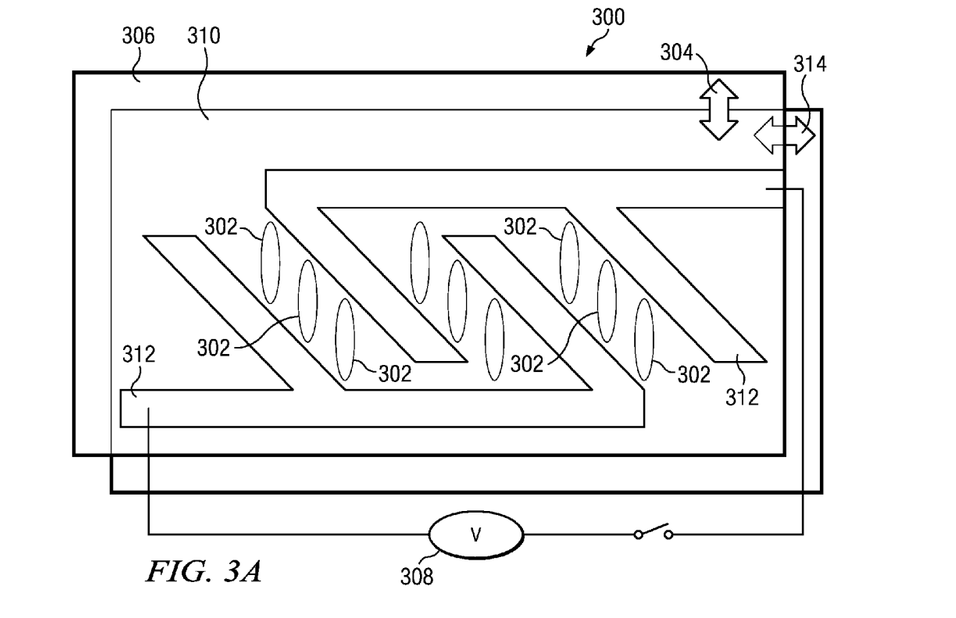
FIG. 3A is a schematic diagram illustrating a first exemplary in-plane switching device comprising LC cells in a first state, in accordance with the present disclosure.
Figure 3B:
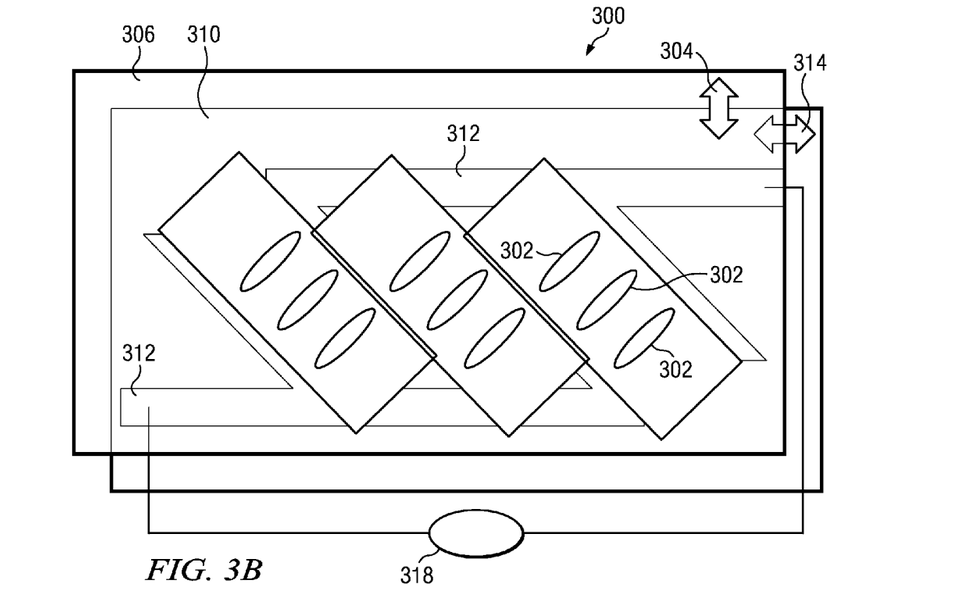
FIG. 3B is a schematic diagram illustrating the first exemplary in-plane switching device of FIG. 3A comprising LC cells in a second state, in accordance with the present disclosure.

FIGS. 3a and 3b illustrate an exemplary IPS device 300 that may be incorporated into the in-plane LC modulator 106, 206 discussed above or any of the exemplary embodiments disclosed herein. As shown in FIG. 3a, LC cells 302 of IPS structure 300 may be disposed between electrodes 312 connected to a power supply 308 and align in an exemplary first in-plane orientation along an optic axis 304 of the input polarizer 306 when no voltage is applied. Such a first in-plane orientation of the LC cells 302 may allow light exiting the LC cells 302 to have a first state of polarization. In an embodiment, a voltage may be applied with a power supply 308 to the electrodes 312 to reorient the LC cells 302 to a second exemplary in-plane orientation as shown in FIG. 3b. In the second in-plane orientation, the state of polarization of the light exiting the LC cells 302 may be altered to a second state of polarization. As such, switching the LC cells 302 between the first in-plane orientation in FIG. 3a to the second in-plane orientation in FIG. 3b may allow for modulation of the state of polarization of the light exiting the LC cells 302 between the first and second states of polarization.

It is to be appreciated that by configuring the first and second in-plane orientations of the LC cells 302 and the corresponding first and second states of polarization of the exiting light, various polarization modulation schemes may be implemented. In the exemplary embodiment shown in FIGS. 3a and 3b, the LC cells 302 may be reoriented in-plan by 45° to impart a half-wave retardation on the light passing therethrough. Depending on whether such a half-wave retardation is imparted on the light passing through the LC cells 302, light exiting the LC cells 302 may be transmitted or blocked by the output polarizer 310, which may has a transmission axis 314 that is orthogonal to the optic axis 304 of the input polarizer 306. When the LC cells 302 are in its first in-plane orientation shown in FIG. 3a, light exiting the LC cells has the first state of polarization and therefore is substantially blocked by the output polarizer 310. Where the LC cells 302 are in its second in-plane orientation shown in FIG. 3b, the half-wave retardation caused by the LC cells 302 may allow the light exiting the LC cells 302 the have the second state of polarization that align with the transmission axis 314 of the output polarizer 310, thereby allowing the transmission of the exiting light.

The above discussed approach may be implemented, for example, with nematic LC cells 302, but such an embodiment may be somewhat slow with relaxations to the zero volt state often taking many milliseconds. Finely patterned electrodes 312 may used drive nematic LC cells 302, and such an approach, though feasible as part of a photolithographically defined display panel, may add unnecessary cost to large area modulators. For these reasons, in some embodiments, it may be more attractive to LC cells 302 that comprise ferroelectric liquid crystals (FLCs), which naturally switch in-plane in response to vertically applied electric fields.

Figure 3C:
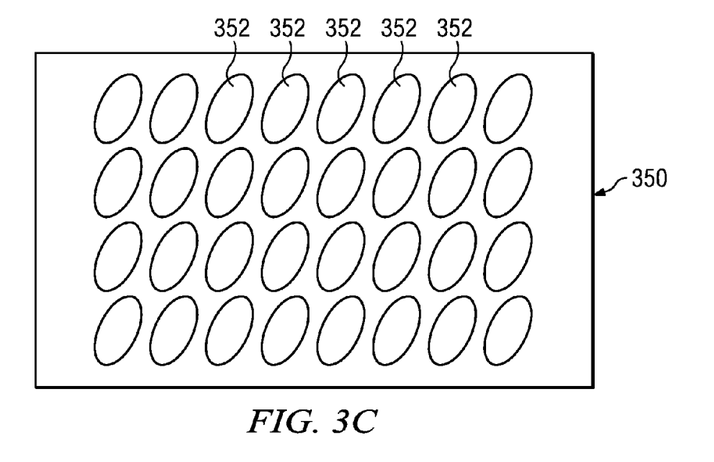
FIG. 3C is a schematic diagram illustrating a second exemplary in-plane switching device, in accordance with the present disclosure.

FIG. 3c illustrates an IPS device 350 comprising FLC-based LC cells 352. The IPS device 350 may allow for faster response time as the FLC-based LC cells 352 may be driven to first and second in-plane orientations by alternating voltage polarities by virtue of their permanent dipole. On the other hand, an embodiment of the IPS device 350 may be difficult to make as FLCs may form crystalline layers that are prone to defects from layer dislocations. Modern fabrication techniques may make the surface stabilized mode more feasible, but, it is to be appreciated that it may be more attractive in some embodiments to configure the IPS device 300 or 350 to be polymer stabilized devices that rely on bulk alignment via an internal polymer matrix.

Referring to the above discussed embodiments, it is to be appreciated that the configurations of the retarder films 130, 132, 230, 232, the in-plane LC modulator 106, 206, and the eyewear analyzer 208 may be varied depending on performance considerations for the system 100, 200. An exemplary performance consideration may be the transmittance of the eyewear analyzer 208. The extent to which the light transmits through the eyewear analyzer 208 in the stereoscopic system 200 may depend on how orthogonal the first and second states of polarization of the modulated light are over the visible spectrum. The brightness and chromaticity of the light transmitted by each of the left and right analyzer 210, 212 may be matched when perfect blocking is enforced, though color balancing is quite often desirable. The nature of color correction may limit the brightness of the overall system to that of the dimmest transmitting primary color. The closer the polarization states are to being orthogonal for all colors, the less the transmission loss and the higher the brightness. In addition to the transmittance, another design consideration may compatibility with circularly analyzing cinema eyewear, whose lenses may be made from single quarter-wave (QW) films laminated to a sheet polarizer. Exemplary QW modulation approaches have been discussed by the commonly-owned U.S. Pat. No. 5,619,355, which is herein incorporated by reference.

Figure 4:
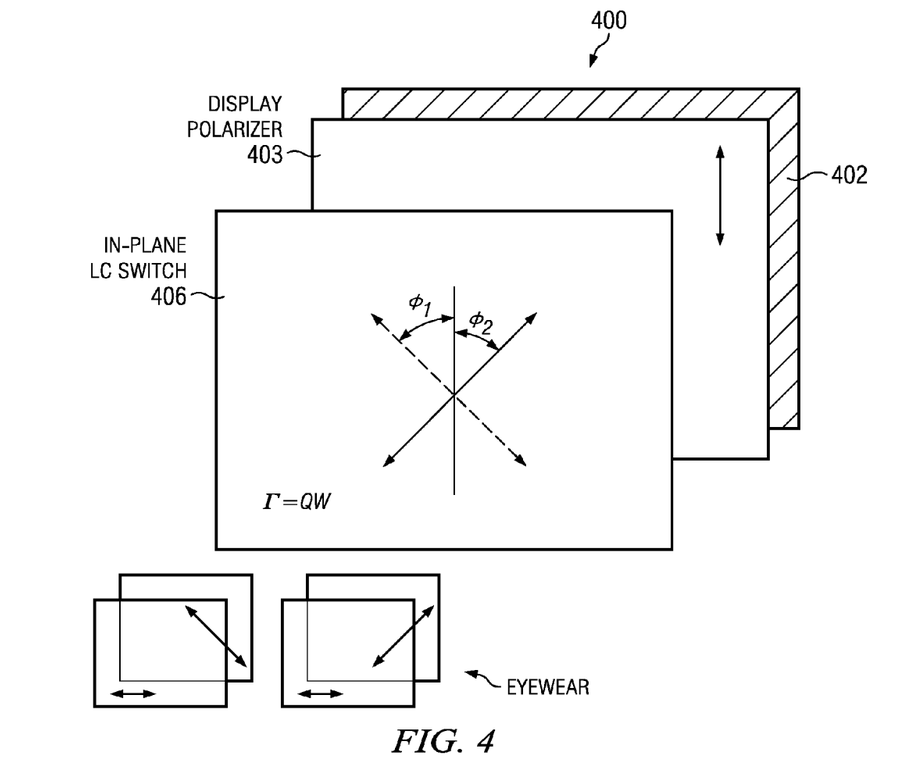
FIG. 4 is a schematic diagram illustrating a first implementation of exemplary stereoscopic display system shown in FIG. 1, in accordance with the present disclosure.

FIG. 4 is a schematic diagram of an exemplary stereoscopic system 400 operable to implement a circular polarization modulation scheme. In an embodiment, the stereoscopic system 400 may include a display 402, an output polarizer 403, and an in-plane LC modulator 406, all of which may be configured similarly to the display 102, 202, the output polarizer 103, 203, and the in-plane liquid crystal LC modulator 106, 206 discussed above. In an embodiment for an in-plane LC modulator system 400, the LC cells of the in-plane LC modulator 406 may be configured to impart at least a quarter wave (QW) retardance ($\Gamma=\Delta n.d \sim 130$ nm) for visible wavelengths ($\lambda > 450$ nm) in order to provide near orthogonal first and second states of polarization for the modulated light. In an exemplary embodiment, to impart the desired QW retardance, the LC cells of the in-plane LC modulator 406 may be configured to switch between the first and second in-plane orientations that are substantially aligned at 90° relative to each other. For example, in the illustrated embodiment, the 90° alignment of the first and second in-plane orientations, $\phi_1$ and $\phi_2$, may be configured according to equation (1):

$$\phi_1 - \phi_2 = 45° \quad (1)$$

Though feasible, high-angle switching for the LC cells of the in-plane LC modulator 406 may be difficult to achieve in some embodiments.

Figure 5:
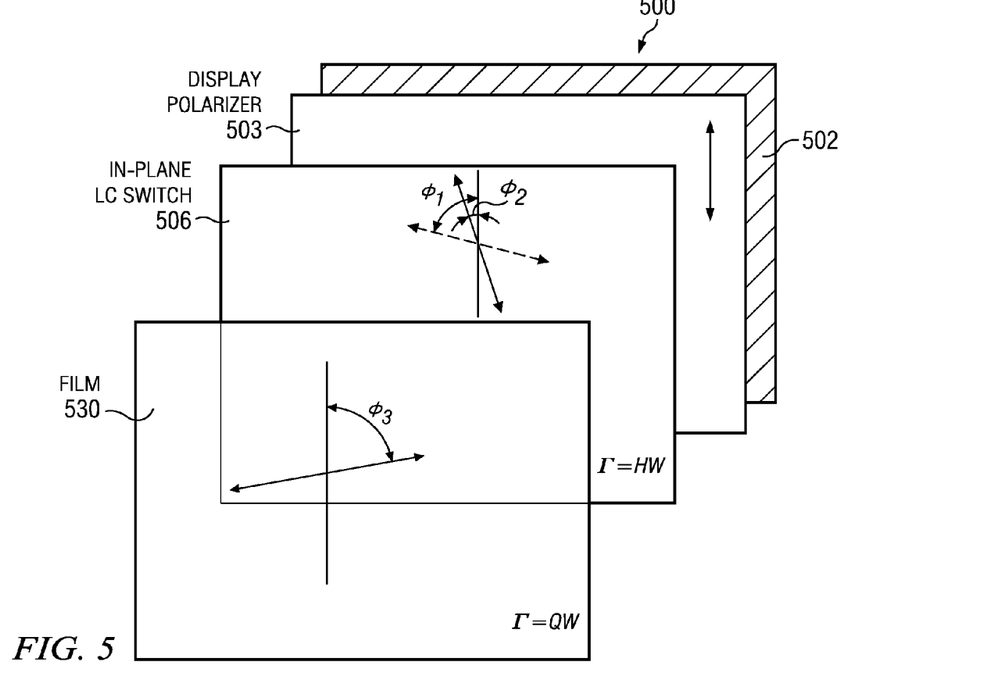
FIG. 5 is a schematic diagram illustrating a second implementation of exemplary stereoscopic display system shown in FIG. 1, in accordance with the present disclosure; in accordance with the present disclosure.

FIG. 5 is a schematic diagram of an exemplary stereoscopic system 500 operable to more easily implement a desired polarization modulation scheme. In an embodiment, the stereoscopic system 500 may include a display 502, an output polarizer 503, an in-plane LC modulator 506, and a retarder 530 all of which may be configured similarly to the display 102, 202, the output polarizer 103, 203, the in-plane liquid crystal LC modulator 106, 206, and the retarder 130, 230 discussed above. Compared to the modulator 406, the in-plane LC modulator 506 may be configured to adjust the retardance of the LC cells as a trade-off for smaller angle switching, which would allow for easier implementation. In an embodiment, a limit to this trade-off may be reached when the LC cells of the in-plane LC modulator 506 is configured to impart an in-plane half-wave (HW) retardance by switching between the first and second in-plane orientations that are substantially aligned at 45° relative to each other. For example, in the illustrated embodiment, the 45° alignment of the first and second in-plane orientations, $\phi_1$ and $\phi_2$, may be configured according to equation (2):

$$\phi_1 - \phi_2 = 45° \quad (2)$$

In such an embodiment, the in-plane LC modulator 506 is operable to provide modulated light having orthogonal linear polarization states regardless of the choices of $\phi_1$ and $\phi_2$ at wavelengths that are substantially a half wave. This offers the possibility of several circular polarization modulation schemes when a passive QW retarder 530 is added to convert the polarization state of the modulated light into circular polarization. A generic circular polarization modulator solution exists for various $\phi_1$ and $\phi_2$ orientation angles. In an embodiment, the orientation of the QW retarder 530, $\phi_3$ may be configured according to equation (3):

$$\phi_3 = 2\phi_2 \pm 45° \quad (3)$$

For the design wavelength, which is the wavelength for which both LC cells of the in-plane LC modulator 506 and QW retarder 530 impart a half wave and a quarter wave retardation, respectively, the system 500 is operable to provide modulated light with substantially perfect circular polarization, which may therefore be substantially perfectly analyzed by eyewear analyzers designed around the same wavelength. For other wavelengths, there may be some leakage that produces image cross-talk due to imperfection in the circular polarization of the modulated light and imperfect transmission and blocking at by the eyewear analyzers. In an embodiment, this may be minimized in the specific case where $\phi_2 = 0°$.

Figure 6:
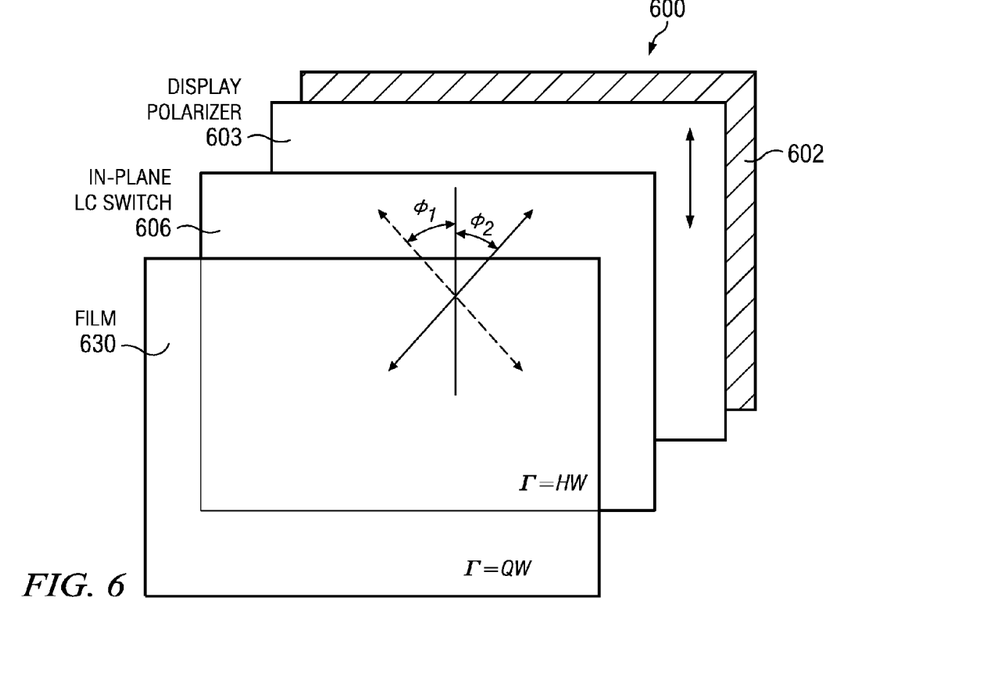
FIG. 6 is a schematic diagram illustrating a third implementation of exemplary stereoscopic display system shown in FIG. 1, in accordance with the present disclosure; in accordance with the present disclosure.

FIG. 6 is a schematic diagram of an exemplary stereoscopic system 600. In an embodiment, the stereoscopic system 600 may include a display 602, an output polarizer 603, an in-plane LC modulator 606, and a retarder 630 all of which may be configured similarly to the display 502, the output polarizer 503, the in-plane LC modulator 506, and the retarder 530 discussed above. The illustrated system 600 and the in-plane LC modulator 606 provide an example of a symmetric modulation scheme where $\phi_1 = -\phi_2 = 22.5°$. This embodiment may allow left/right eye symmetry regardless of the switching angle between the first and second in-plane orientations of the LC cell of the in-plane LC modulator 606. Such a switching angle may often be dependent on temperature. In some embodiment, symmetry between eyes may be an advantage both in conditioning the underlying signal to suppress cross-talk and reducing eye fatigue.

Figure 7:
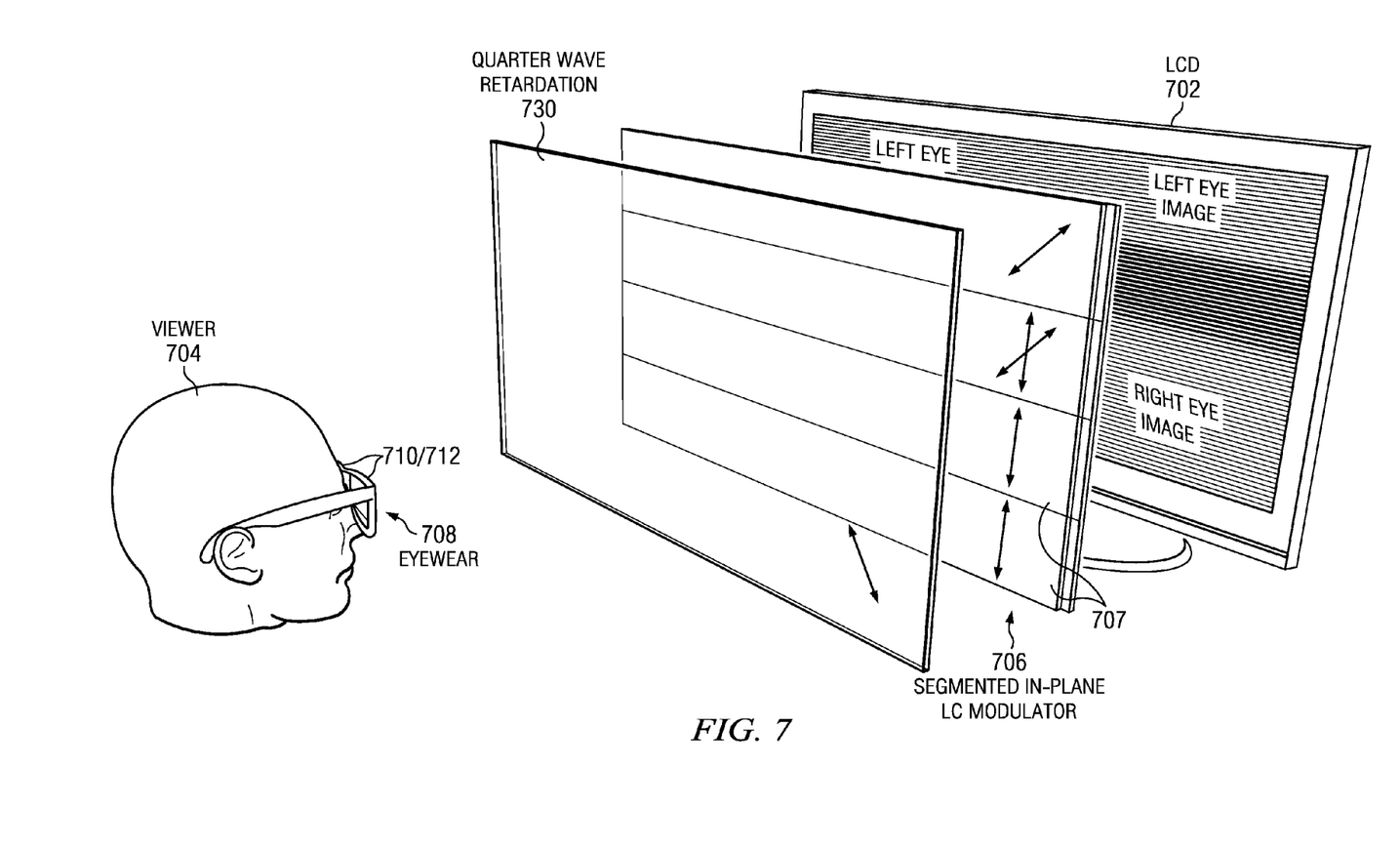
FIG. 7 is a schematic diagram illustrating an exemplary stereoscopic segmented display system, in accordance with the present disclosure.

FIG. 7 is a schematic diagram illustrating an exemplary time-sequential stereoscopic display system 700 with a modest 45° switching modulation scheme. Illustrated in FIG. 7, the system 700 may include an LCD display 702 operable to provide left and right eye images at approximately 120 Hz or greater, updated with a line-by-line scrolling update. The finite response of the LC material in the display 702 may cause a mixed image region to exist that follows the address line. The size of this intermediate region may be dependent on the limiting black to white response of the LC material of the display 702. Slower grey to grey transitions may occupy a larger region, but suitable conditioning of the video signal may accommodate for the mixing. To allow for good isolation between settled regions of the display 702, the system 700 may include a segmented modulator 706 comprising segments 707 that may track the scrolling address. The segments 707 are of order or less than a vertical width of the mixed LC region. In an embodiment, the in-plane LC modulator 706 may be addressed with independent striped horizontal electrodes (not shown). As such, to avoid contamination of the images, illumination may be turned off in a region where there is mixed LC material of the display 702 and LC cells of the in-plane LC modulator 706, thereby present a black region in the display 702 as shown in FIG. 7. This operation may be achieved by conventional scrolled backlight illumination technology used for local dimming and motion artifact reduction.

The in-plane LC modulator 706 may be configured as a single though segmented switch. In an embodiment, like the in-plane LC modulator 506 of system 500, the thickness of the modulator 706 may be chosen to impart a half-wave retardance (e.g., ~250 nm @ 589 nm). In an exemplary embodiment, the LC cells of the in-plane LC modulator 706 may switch between being either parallel with the input polarization direction or +45° from it. In an embodiment, to provide the good match and avoid leakage of wavelengths other than the design wavelength, the input polarization direction from the display 702 may be vertical as shown in various embodiments in the present disclosure and consistent with most LCD TVs. The system 700 may further include a passive quarter wave retarder 730 oriented at −45° to the input polarization direction as illustrated in FIG. 7. When the LC cells of the in-plane LC modulator 706 are oriented in its first in-plane orientation (along the input polarization direction), the in-plane LC modulator 706 and the retarder 730 may act as a passive quarter wave film oriented at 45° relative to the input polarization direction and may output modulated light that is circularly polarized accordingly. When the LC cells of the in-plane LC modulator 706 are oriented in its second in-plane orientation (along 45° relative to the input polarization direction), in-plane LC modulator 706 and the retarder 730 may act as crossed HW and QW films, which would be equivalent to a passive quarter wave oriented at −45° relative to the input polarization direction. As such, the modulated light may be imparted an opposite handed circular polarization state upon the exiting.

Given that the LC cells of the in-plane LC modulator 706 and the retarder 730 may cooperate to behave as a passive QW retarder oriented at 45° or −45° depending on whether the LC cells of the in-plane LC modulator 706 are oriented in its first or second in-plane orientations, respectively, the eyewear analyzer may be configured as ideal inverse analyzers 710, 712. The analyzer 710, 712 may include passive quarter wave retarders 714, 718 oriented orthogonally at ±45° and bonded to polarizers 716, 720. In the illustrated embodiment, the orientations of the polarizers 716, 720 are crossed with the input polarization direction. In another embodiment, the polarizers 716, 720 may have other orientations relative to the input polarization direction, depending on the configurations of the in-plane LC modulator 706, the retarder 730, and retarders 714, 718.

It is to be appreciated that above discussed first and second in-plane orientations of the LC cells of the in-plane modulator 706 may be varied to allow for different design considerations. For example, in an embodiment, the LC cells of the in-plane modulator 706 may be configured according to the embodiment shown in FIG. 6, to provide symmetrical switching either side of the vertical input polarization. The passive QW retarder 730 would then be oriented horizontally. Such an embodiment may allow for symmetry between the eyes even if the angle between first and second in-plane orientations of the LC cells differ from 45° as is the case for different temperatures. Such a configuration of the system 700 may allow for symmetry, but the system 700 may exhibit some leakage unless the eyewear 708 is modified to include accurate inverse analyzers 710, 712. This approach may be feasible as the same eyewear 708 may perform at a tolerable level in the cinema and yet operate perfectly with a dedicated system 700. As another example, another embodiment of the system 700 may utilize the 90° switching approach shown in FIG. 4.

To allow for symmetry between the viewer's eyes and substantially perfect blocking, the dispersion of the passive retarders both on the modulation side and on the eyewear side should match that of the LC cells in the modulator. In some embodiments, while materials such as liquid crystal polymers (LCPs) may be used, the small deviation attributable to dispersion mismatch may be acceptable, as this allows implementations with more cost effective stretched polycarbonate or polyolefin retardation films.

The LC cells of the in-plane LC modulator 706 may be structured according to the disclosed embodiments in disclosed herein, including a surface stabilized FLC, with the brushed alignment direction bisecting the −45° direction (i.e. at −22.5°). The LC cells of the in-plane LC modulator 706 in another embodiment, may be a nematic in-plane switching structure as illustrated in FIGS. 3a and 3b, or possibly employ a polymer stabilized LC (ferroelectric or otherwise). In an embodiment, the LC cells may include low cost flexible substrates. Here, the LC structure may be supported in the bulk by a polymer matrix giving increased physical damage tolerance and increased relaxation rates. In an embodiment, substrates may be made from a plastic material, and a QW retardance may be built into the substrates, which may eliminate the cost of an additional passive QW retarder while making use of the birefringence stability of pre-stretched polymer substrates, as taught in commonly-owned U.S. application Ser. No. 13/032,466, which is herein incorporated by reference.

While systems 700 and some embodiments in the present disclosure may have been described with respect to a circular polarization modulation scheme, it is to be appreciated that some embodiments could attempt to switch linear polarization using non-dispersive materials. In an embodiment, an achromatic half-wave in-plane modulator could switch between 0 and 45 degrees, outputting modulated light with polarization axis in the vertical or horizontal direction. Linear analyzing eyewear may be attractive from a cost point of view though head tilt tolerance may suffer. Additional embodiments of implementations for linear modulation could involve two cell in-plane designs as described in the commonly-owned U.S. Pat. No. 7,528,906, which is herein incorporated by reference.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method of providing stereoscopic images, the method comprising:

directing polarized light from a display along a light path towards an in-plane liquid crystal modulator, wherein the in-plane liquid crystal modulator comprises at least one liquid crystal cell having substantially no out-of-plane retardance;

receiving the polarized light at the at least one liquid crystal cell;

switching the at least one liquid crystal cell between first and second in-plane orientations sequentially to provide modulated light having first and second states of polarization, respectively; and transmitting the modulated light having the first state of polarization at a left analyzer of eyewear and transmitting the modulated light having the second state of polarization at a right analyzer of the eyewear;

wherein the modulated light having the first state of polarization is operable to form a left image and the modulated light having the second state of polarization is operable to form a right image; and wherein the left analyzer comprises a left inverse retarder and a left polarizer layer optically following the left inverse retarder, and the right analyzer comprises a right inverse retarder and a right polarizer layer optically following the right inverse retarder, wherein the left and right inverse retarders each comprise a retardance substantially inverse to an in-plane retardance of the at least one liquid crystal cell and have substantially no out-of-plane retardance.

2. The method of claim 1, wherein directing polarized light comprises outputting the left image and the right image sequentially from the display and switching the at least one liquid crystal cell synchronously.

3. A stereoscopic system, comprising:
a display operable to provide polarized light along a light path;
an in-plane liquid crystal modulator disposed in the light path, wherein the in-plane liquid crystal modulator comprises at least one liquid crystal cell having an in-plane retardance and substantially no out-of-plane retardance, the at least one liquid crystal cell being operable to receive the polarized light and to switch between first and second in-plane orientations sequentially to provide modulated light having first and second states of polarization, respectively; and
eyewear comprising a left analyzer and a right analyzer, wherein the left analyzer comprises a left inverse retarder and a left polarizer layer optically following the left inverse retarder, and the right analyzer comprises a right inverse retarder and a right polarizer layer optically following the right inverse retarder, wherein the left and right inverse retarders each comprise a retardance substantially inverse to the in-plane retardance of the at least one liquid crystal cell and have substantially no out-of-plane retardance;
wherein, when the at least one liquid crystal cell is in the first in-plane orientation, the left analyzer is operable to receive the modulated light having the first state of polarization and to transmit light comprising a left image; and
wherein, when the at least one liquid crystal cell is in the second in-plane orientation, the right analyzer is operable to receive the modulated light having the second state of polarization and to transmit light comprising a right image.

4. The stereoscopic system of claim 3, wherein the left and right inverse retarders comprise first and second optical axes, respectively, the first and second optical axes being substantially orthogonal to each other.

5. The stereoscopic system of claim 3, wherein the polarized light comprises an input polarization direction, and the left and right polarizers of the eyewear are substantially oriented orthogonally to the input polarization direction.

6. The stereoscopic system of claim 3, wherein the at least one liquid crystal cell has an in-plane retardance of a half wave, and the stereoscopic display system further comprises a passive quarter wave retarder disposed in the light path, the passive quarter wave retarder optically following or preceding the in-plane liquid crystal modulator.

7. The stereoscopic display system of claim 3, wherein the stereoscopic display system further comprises a passive retarder disposed in the light path.

8. The stereoscopic display system of claim 7, wherein the passive retarder comprises a stack of passive retarder films.

9. The stereoscopic display system of claim 7, wherein the passive retarder is disposed in the light path between the display and the in-plane liquid crystal modulator.

10. The stereoscopic display system of claim 9, wherein the stereoscopic display system further comprises a second passive retarder disposed in the light path, the second passive retarder optically following the in-plane liquid crystal modulator.

11. The stereoscopic display system of claim 7, wherein the passive retarder optically follows the in-plane liquid crystal modulator.

12. The stereoscopic display system of claim 3, wherein the display comprises an output polarizer.

13. The stereoscopic display system of claim 3, wherein the at least one liquid crystal cell has an in-plane retardance of a quarter wave.

14. The stereoscopic display system of claim 13, wherein the first and second in-plane orientations are substantially aligned at 90° relative to each other.

15. The stereoscopic display system of claim 3, wherein the at least one liquid crystal cell has an in-plane retardance of a half wave, and the stereoscopic display system further comprises a passive quarter wave retarder disposed in the light path, the passive quarter wave retarder optically following or preceding the in-plane liquid crystal modulator.

16. The stereoscopic display system of claim 15, wherein the first and second in-plane orientations are substantially aligned at 45° relative to each other.

17. The stereoscopic display system of claim 3, wherein the first and second in-plane orientations are symmetrically aligned relative to a polarization direction of the polarized light.

18. The stereoscopic display system of claim 3, wherein the in-plane liquid crystal modulator comprises segments operable to be addressed separately.

19. The stereoscopic display system of claim 3, wherein the at least one liquid crystal cell comprises ferroelectric liquid crystals.

20. The stereoscopic display system of claim 3, wherein the at least one liquid crystal cell comprises nematic liquid crystals.

* * * * *